United States Patent [19]

Bauer

[11] Patent Number: 5,700,499
[45] Date of Patent: Dec. 23, 1997

[54] VALVE MEMBER LOCATING INSERT FOR INJECTION MOLDING NOZZLE

[75] Inventor: Klaus Bauer, Neuendettelsau, Germany

[73] Assignee: Mold-Masters Limited, Georgetown, Canada

[21] Appl. No.: 520,161

[22] Filed: Aug. 28, 1995

[30] Foreign Application Priority Data

Jun. 30, 1995 [CA] Canada .................................. 2153079

[51] Int. Cl.$^6$ .................................................. B29C 45/23
[52] U.S. Cl. .................. 425/564; 264/328.9; 425/566
[58] Field of Search ........................... 425/562, 563, 425/564, 565, 566; 264/328.9

[56] References Cited

U.S. PATENT DOCUMENTS 4,412,807  11/1983  York ....................................... 425/564
4,925,384  5/1990  Manner .................................. 425/566
5,334,008  8/1994  Gellert .................................. 425/549

FOREIGN PATENT DOCUMENTS 5096578  4/1993  Japan .

Primary Examiner—Tim Heitbrink
Attorney, Agent, or Firm—Dalesman & Company

[57] ABSTRACT

A valve member locating insert to be mounted in the front end of an injection molding nozzle. The locating insert has an outer mounting collar portion and a concentric inner collar portion which receives the reciprocating valve member to accurately locate it to prevent damage around the gate. The inner collar portion is connected to the outer collar portion by a single connecting vane portion. Melt flows through the locating insert in a C-shaped space between the collar portions. The vane portion and the inner collar portion have upstream and downstream ends which extend diagonally to be washed by the melt flow to avoid deadspots and reduce turbulence.

3 Claims, 3 Drawing Sheets 5,700,499

VALVE MEMBER LOCATING INSERT FOR INJECTION MOLDING NOZZLE

BACKGROUND OF THE INVENTION

This invention relates generally to valve gated injection molding apparatus and more particularly to a valve member locating insert to be mounted in the front end of a nozzle.

Valve gated injection molding with actuating mechanism connected to the rear end of an elongated valve member to reciprocate the valve member in a melt bore in a nozzle is well known. It is also well known that in many cases it is necessary to accurately locate the reciprocating valve member to avoid damage to the mold around the gate as it is driven forwardly to the closed position.

Valve gated injection molding with actuating mechanism connected to the rear end of the valve member is well known. Often the valve member is located in alignment with the gate by the bore where it passes through the manifold and a sealing bushing near its rear end. However, this has the disadvantage that the location of the reciprocating valve member is not always maintained sufficiently accurately, particularly if the gate is cylindrical.

As seen in Japanese Patent Publication Number JP 5,096,578 dated Apr. 20, 1993, it is also known to provide a valve member locating insert with three fins or vane portion extending to a cylindrical inner collar portion through which the reciprocating valve member extends. While this improves the location of the valve member, it has the disadvantage that the three distinct flow lines are produced in the product by the melt parting to flow around the vane portions. It also has the disadvantage that the vane portions and the collar produce turbulence and create deadspots in the melt flow which cause problems with colour or material changes and produce inferior products.

U.S. Pat. No. 5,334,008 to Gellert which issued Aug. 2, 1994, shows a valve member locating insert having a pair of spiral blades which curve around the valve member to hold it in place. While this is acceptable for some applications, it still has the disadvantage that it parts the melt flow twice and thus produces two flow lines in the molded product.

SUMMARY OF THE INVENTION

Accordingly, it is an object of the present invention to at least partially overcome the disadvantages of the prior art by providing a valve member locating insert having only a single connecting vane portion extending to the inner collar portion and by them having upstream and/or downstream ends extending on the diagonal to avoid deadspots, reduce turbulence in the melt flow, and provide faster colour changes.

To this end, in one of its aspects, the invention provides an injection molding valve member locating insert to be mounted in a nozzle with an elongated valve member reciprocating in a melt bore extending through the nozzle, the locating insert having an inner cylindrical valve member receiving collar portion and an outer cylindrical mounting collar portion extending concentrically around the inner receiving collar portion with a melt flow space extending therebetween, the inner receiving collar portion having a central opening to receive the valve member therethrough to accurately locate the valve member in the melt bore, the outer collar portion to fit in a seat in the front end of the nozzle to be secured in place with the melt flow space extending between the inner receiving collar portion and the outer mounting collar portion in alignment with the melt bore of the nozzle, having the improvement comprising the locating insert having only a single connecting vane portion extending radially between the inner receiving collar portion and the outer mounting collar portion to retain the inner receiving collar portion in place in the melt bore, the single connecting vane portion and the inner receiving collar portion having an upstream end which extends in a direction diagonally downwardly and inwardly away from the outer mounting collar portion.

Further objects and advantages of the invention will appear from the following description taken together with the accompanying drawings.

DETAILED DESCRIPTION OF THE INVENTION

Figure 1:
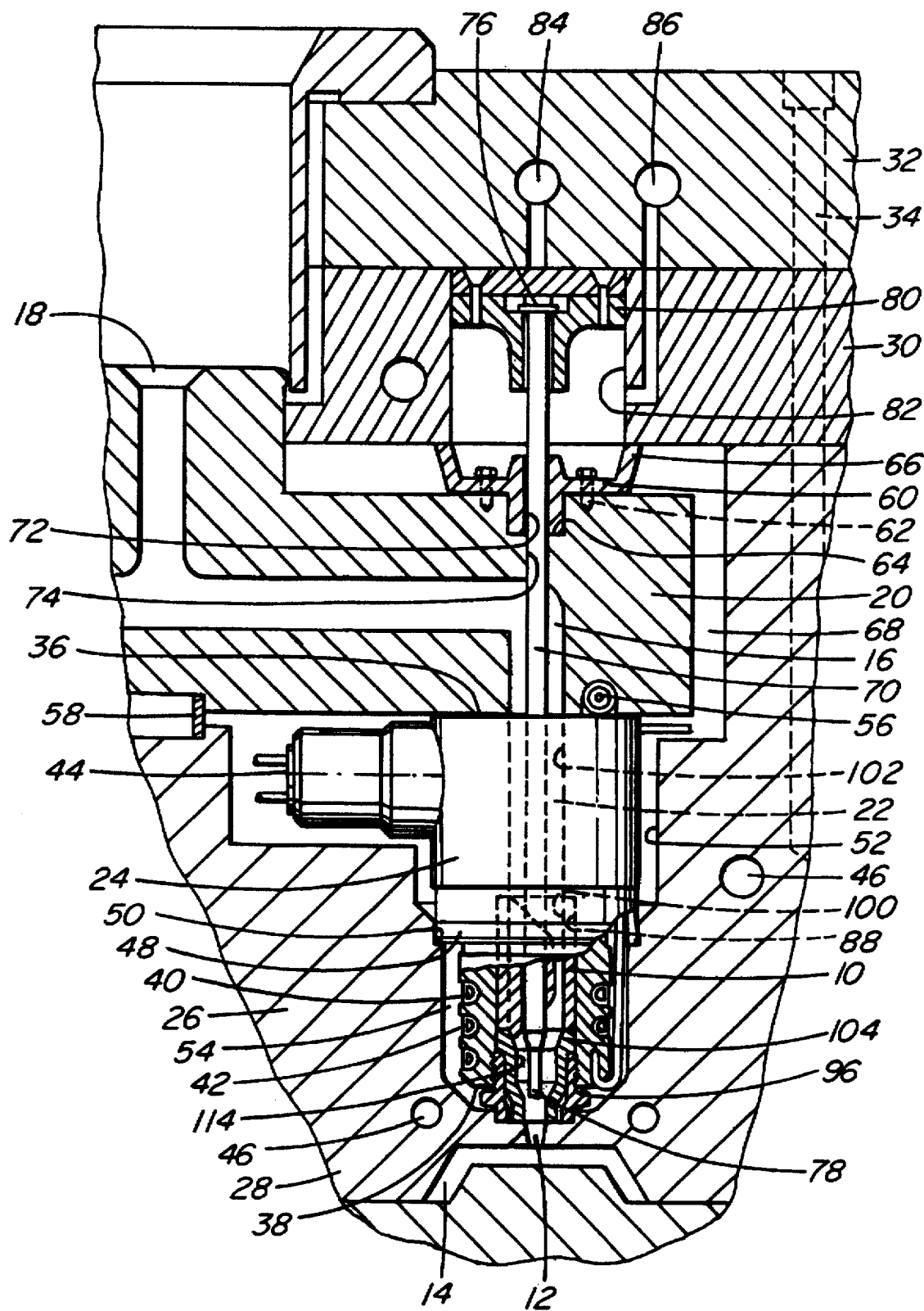
FIG. 1 is a sectional view of a portion of a multi-cavity valve gated injection molding apparatus showing a valve member locating insert according to one embodiment of the invention.
Figure 2:
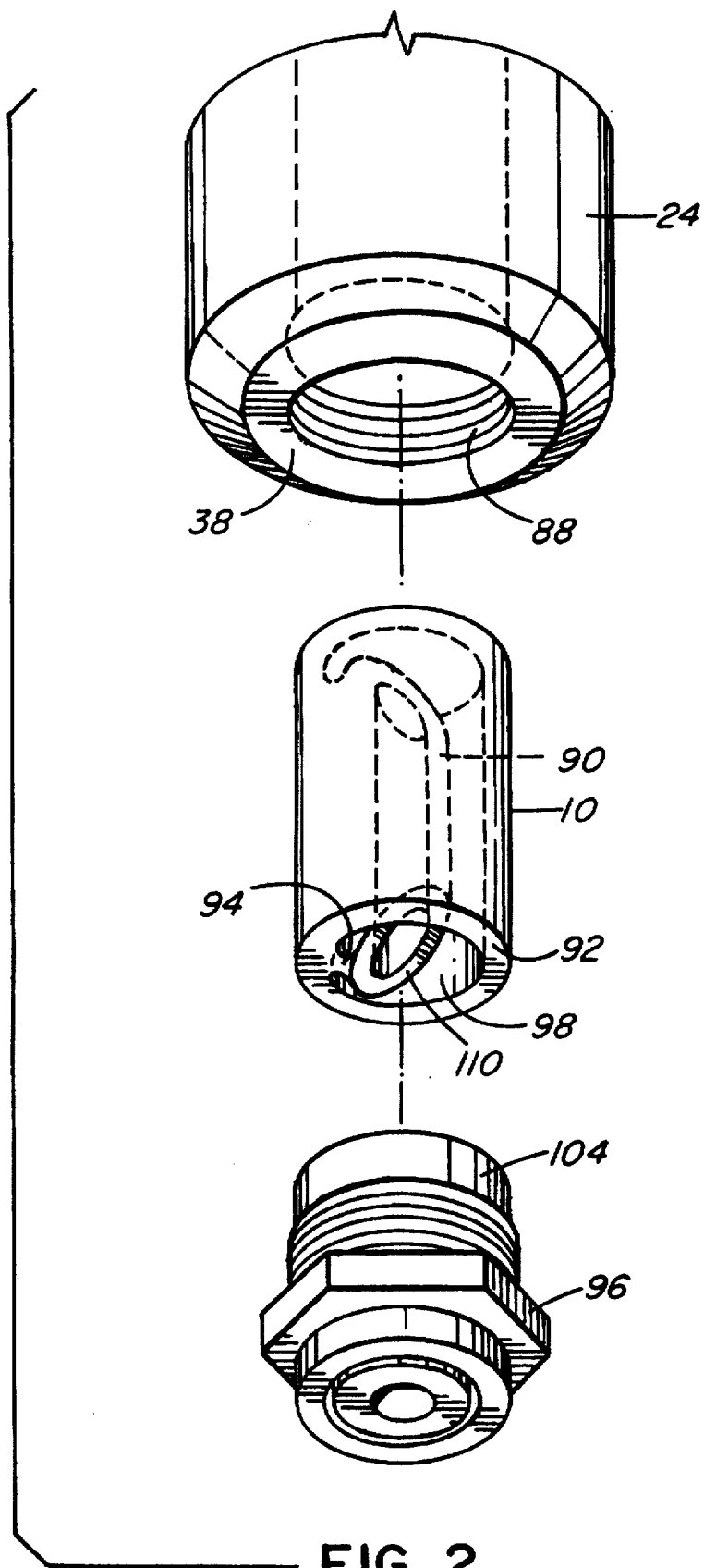
FIG. 2 is an isometric view showing the locating insert and the nozzle seal in position for mounting in the front end of the nozzle.
Figure 3:
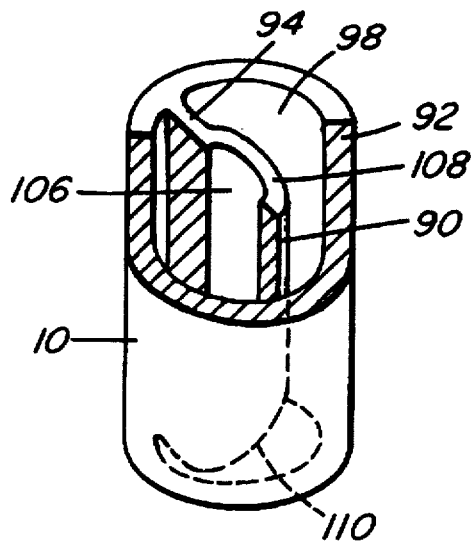
FIG. 3 is an isometric view of the same locating insert from above.
Figure 4:
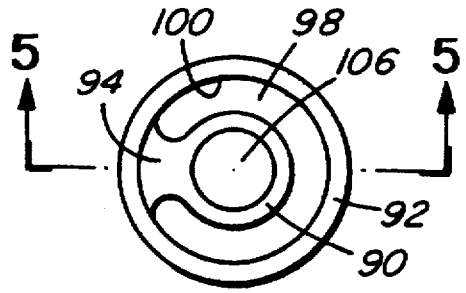
FIG. 4 is a plan view of the locating insert.

Reference is first made to FIG. 1 which shows part of a multi-cavity valve gated injection molding apparatus having a valve member locating insert 10 according to a preferred embodiment of the invention as describe in detail below. As can be seen, pressurized melt is conveyed to a gate 12 leading to a cavity 14 through a melt passage 16 which extends from a central inlet 18 and branches in a melt distribution manifold 20 to a central melt bore 22 in each of several steel nozzles 24 seated in the mold 26. While the mold 26 normally has a greater number of plates depending upon the application, in this case only a cavity plate 28, a cylinder plate 30 and a back plate 32 which are secured together by bolts 34 are shown for ease of illustration. Each nozzle 24 has a rear end 36 which abuts against the melt distribution manifold 20, a front end 38, and is heated by an integral electrical heating element 40 which extends in a coil 42 around the central melt bore 22 to an external terminal 44. The mold 26 is cooled by pumping cooling water through cooling conduits 46 and each nozzle 24 has a cylindrical locating flange 48 which seats against a circular locating shoulder 50 in a well 52 in the cavity plate 28 to provide an insulative air space 54 between the heated nozzle 24 and the surrounding cooled mold 26. The melt distribution manifold 20 is heated by an integral electrical heating element 56 and is mounted between the cavity plate 28 and cylinder plate 30 by a central locating ring 58 and sealing bushings 60. Each sealing bushing 60 is secured by screws 62 in a matching seat 64 in the manifold 20 and has a flange 66 which extends rearwardly against the cylinder plate 30. This provides another insulative space 68 between the heated manifold 20 and the surrounding cooled cavity plate 28 and cylinder plate 30.

An elongated valve member 70 extends through a bore 72 in the sealing bushing 60 and a bore 74 through the manifold 20 centrally into the melt passage 16 and the aligned melt bore 22 through each nozzle 24. The valve member 70 has an enlarged rear end 76 and a cylindrical front end 78 which is received in the gate 12 in the closed position. The rear end 76 of the valve member 70 is connected to pneumatic actuating mechanism which includes a piston 80 seated in a cylinder 82 in the cylinder plate 30. Controlled air pressure is applied to opposite sides of the piston 80 through air ducts 84, 86 extending through the back plate 32 to reciprocate the valve member 70 between a retracted open position and the forward closed position in which its front end 78 fits in the gate 12. While a pneumatic actuating mechanism is shown for ease of illustration, of course hydraulic actuating mechanisms are also used for many applications.

The central melt bore 22 through the nozzle 24 has a larger diameter portion extending from the front end 38 to form a seat 88 in which the valve member locating insert 10 is received. As seen in FIGS. 2–5, the locating insert 10 has an inner cylindrical collar portion 90 connected to an outer cylindrical collar portion 92 by a single radially extending connecting vane portion 94. The outer collar portion 92 extends concentrically around the inner collar portion 90 and fits in the seat 88 in the front end 38 of the nozzle 24 to mount the locating insert 10. The locating insert 10 is secured in place by a two-piece nozzle seal 96 which is screwed into the seat 88 in the front end 38 of the nozzle 24. The single connecting vane portion 94 leaves the locating insert 10 with C-shaped melt flow space 98 extending between the inner receiving collar portion 90 and the outer mounting collar portion 92 in alignment with the central melt bore 22. The inner surface 100 of the outer collar 92 is flush with the inner surface 102 of the melt bore 22 and the inner piece 104 of the nozzle seal 96 tapers inwardly into alignment with the gate 12 to minimize turbulence in the melt flow. The inner collar portion 90 has a central opening 106 therethrough in which the valve member 70 is received. The central opening 106 is made to fit around the valve member 70 to allow it to reciprocate in the opening 106 while accurately locating the elongated valve member 70 with its cylindrical front end 78 in precise alignment with the gate 12 to avoid damage to the mold around the gate 12 as the valve member 70 is driven to the forward closed position.

Figure 5:
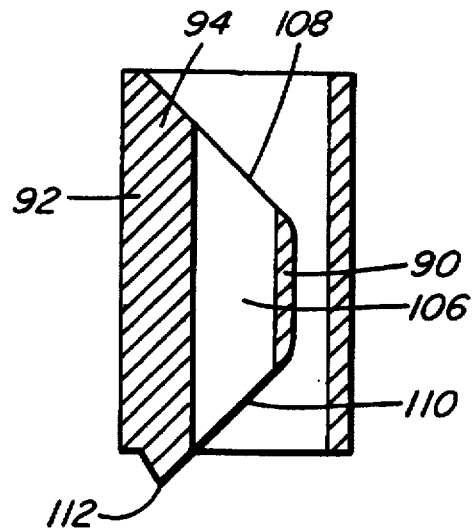
FIG. 5 is a sectional view above line 5—5 in FIG. 4.

According to the invention the single connecting vane portion 94 and the inner collar portion 90 have an upstream end 108 and a downstream end 110 which extend diagonally. As best seen in FIG. 5, the upstream end 108 extends in a direction diagonally downwardly and inwardly away from the outer collar portion 92, while the downstream end 110 extends in a direction diagonally downwardly and outwardly towards the outer collar portion 92. Thus, the upstream end 108 and downstream end 110 extend at an angle with the melt flow so the melt flows along the ends 108, 110 to wash or flush them to avoid deadspots in the melt flow and to minimize turbulence. In this embodiment, the ends 108, 110 extend at an angle of approximately 45°, but in other embodiments can have other angles sufficient to produce this washing action by the melt flow. While the upstream end 108 and downstream end 110 are preferably continuous flat surfaces as shown to facilitate the washing action of the melt flow along them, in other embodiments they can have other configurations which do not interfere with the washing action. As seen in FIG. 5, in this embodiment, the downstream end 110 extends to a curved ridge 112 which meets flush with the inner surface 114 of the inner piece 104 of the nozzle seal 96.

In operation, electrical power is applied to the heating element 56 in the manifold 20 and to the heating elements 40 in the nozzles 24 to heat them to a predetermined operating temperature depending upon the composition of the melt. In this embodiment, controlled pneumatic pressure is applied to the cylinder 82 through air ducts 84, 86 to control actuation of the pistons 80 and valve members 70 according to a predetermined cycle in a conventional manner. When the valve members 70 are in the retracted open position as shown in FIG. 1, hot pressurized melt is injected from a molding machine (not shown) into the melt passage 16 through the central inlet 18 according to a predetermined molding cycle in a conventional manner. The melt passage 16 branches out in the manifold 20 and the melt flows through the melt bore 22 in each nozzle 24, and through the C-shaped space 98 in the locating insert 10 to the respective aligned gate 12 to fill the cavities 14. As mentioned above, some of the melt flowing through the locating insert 10 flows diagonally along the flat surfaces of the upstream and downstream ends 108, 110 of the connecting vane portion 94 and the inner collar portion 90 with a washing action which prevents the formation of deadspots, minimizes turbulence in the melt flow, and provides for faster colour changes. When the cavities 14 are full of melt, injection pressure is held for a short period to pack. Pneumatic pressure to the pistons 80 is then reversed to reciprocate the valve members 70 to the forward closed position in which the cylindrical front ends 78 of each of the valve members 70 is received in one of the gates 12. The injection pressure is then released and, after a short cooling period, the mold is opened for ejection. After ejection, the mold is again closed, pneumatic pressure is applied to retract the valve members 70 to the open position, and melt injection pressure is reapplied to refill the cavities 14. This cycle is repeated continuously every few seconds with a frequency depending upon the number and size of the cavities 14 and the type of material being molded.

While the description of the valve member locating insert has been given with respect to a preferred embodiment of the invention, it will be evident that various other modifications are possible without departing from the scope of the invention as understood by those skilled in the art and as defined in the following claims.

The embodiments of the invention in which an exclusive property or privilege is claimed is defined as follows:

1. In an injection molding valve member locating insert to be mounted in a nozzle with an elongated valve member reciprocating in a melt bore extending through the nozzle, the locating insert having an inner cylindrical valve member receiving collar portion and an outer cylindrical mounting collar portion extending concentrically around the inner receiving collar portion with a melt flow space extending therebetween, the inner receiving collar portion having a central opening to receive the valve member therethrough to accurately locate the valve member in the melt bore, the outer collar portion to fit in a seat in the front end of the nozzle to be secured in place with the melt flow space extending between the inner receiving collar portion and the outer mounting collar portion in alignment with the melt bore of the nozzle, having the improvement comprising;

the locating insert having only a single connecting vane portion extending radially between the inner receiving collar portion and the outer mounting collar portion to retain the inner receiving collar portion in place in the melt bore, the single connecting vane portion and the inner receiving collar portion having an upstream end which extends in a direction diagonally downwardly and inwardly away from the outer mounting collar portion and a downstream end which extends in a direction diagonally downwardly and outwardly towards the outer mounting collar portion.

2. An injection molding locating insert as claimed in claim 1 wherein at least one of the upstream end and the downstream end of the single connecting vane portion and the inner receiving collar portion is a continuous flat surface.

3. An injection molding locating insert as claimed in claim 2 wherein the at least one of the upstream end and the downstream end of the single connecting vane portion and the inner receiving collar portion extend at a diagonal angle sufficient to provide a washing action by melt flowing through the locating insert.

* * * * *